US006568837B2

(12) United States Patent
Denley

(10) Patent No.: US 6,568,837 B2
(45) Date of Patent: May 27, 2003

(54) MOTORIZED HEADLAMP ADJUSTER

(75) Inventor: Ronald S. Denley, Woodstock, IL (US)

(73) Assignee: Elco Textron Inc., Rockford, IL (US)

( * ) Notice: Subject to any disclaimer, the term of this patent is extended or adjusted under 35 U.S.C. 154(b) by 0 days.

(21) Appl. No.: 09/783,645

(22) Filed: Feb. 14, 2001

(65) Prior Publication Data

US 2001/0033494 A1 Oct. 25, 2001

Related U.S. Application Data

(60) Provisional application No. 60/198,945, filed on Apr. 21, 2000.

(51) Int. Cl.[7] .................................................. G01B 5/25
(52) U.S. Cl. ..................... 362/463; 362/524; 362/529; 362/523; 362/460
(58) Field of Search ................................. 362/523, 529, 362/460, 463, 530, 531, 532, 524

(56) References Cited

U.S. PATENT DOCUMENTS

| 5,070,433 A | | 12/1991 | Zillgitt et al. | |
| 5,105,342 A | | 4/1992 | Zillgitt et al. | |
| 5,446,630 A | * | 8/1995 | Chikada et al. | 362/463 |
| 5,446,632 A | * | 8/1995 | Childs et al. | 362/463 |
| 5,897,202 A | * | 4/1999 | Denley | 362/463 |
| 5,906,431 A | * | 5/1999 | Chianale et al. | 362/515 |
| 6,247,834 B1 | * | 6/2001 | Suehiro | 362/463 |
| 6,315,439 B1 | * | 11/2001 | Denley | 362/463 |

FOREIGN PATENT DOCUMENTS

| EP | 0297953 | 5/1992 |
| EP | 0692404 | 1/1996 |
| EP | 0652134 | 3/1998 |
| EP | 0692405 | 9/1999 |

OTHER PUBLICATIONS

Patent Abstracts of Japan, Publication No. 05085255 A, published Apr. 6, 1993, Mazda Motor Corp. Only Abstract.
Patent Abstract of Japan, Publication No. 59008544 A, published Jan. 17, 1984, Koito Mfg. Co. Ltd. Only Abstract.
Patent Abstracts of Japan, Publication No. 58101836 A, published Dec. 14, 1981, Koito Mfg. Co. Ltd. Only Abstract.

* cited by examiner

Primary Examiner—Thomas M. Sember
(74) Attorney, Agent, or Firm—Trexler, Bushnell, Giangiorgi, Blackstone & Marr, Ltd.

(57) ABSTRACT

A motorized headlamp adjuster which is operably connectable to a control circuit and which is engageable with a headlamp assembly. Specifically, the headlamp adjuster includes an adjuster output shaft which is engageable with a reflector of a headlamp assembly. The headlamp adjuster includes a housing, and the adjuster output shaft extends from the housing. The adjuster output shaft preferably has a sealing member thereon which seals with the housing. Preferably, an external surface of the housing also has a sealing member thereon for engaging and sealing with the housing of the headlamp assembly when the headlamp adjuster is installed. As such, the headlamp adjuster is sealed, and seals with a headlamp housing when installed. Preferably, the headlamp adjuster does not include several complex components and is relatively easy to assemble.

20 Claims, 9 Drawing Sheets

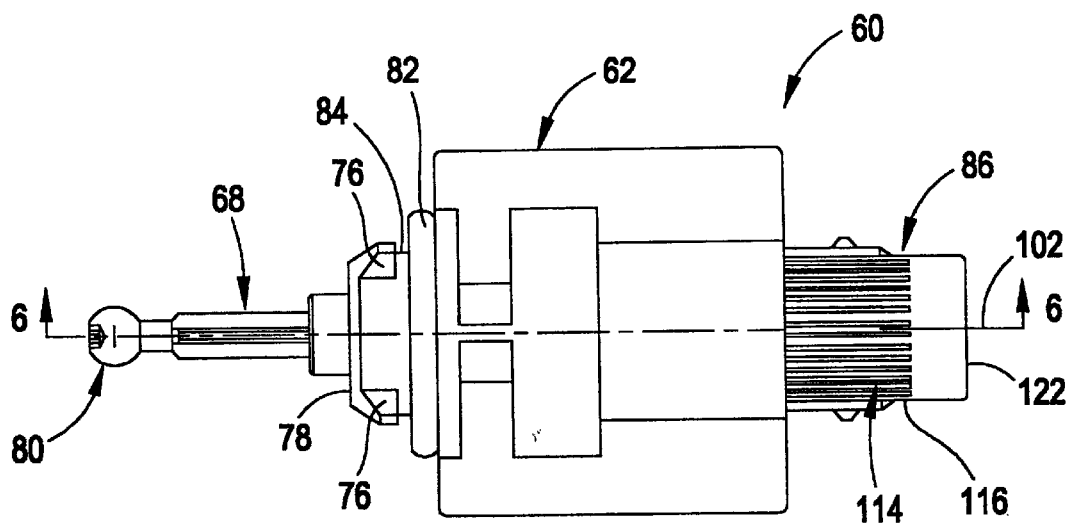
FIG. 2
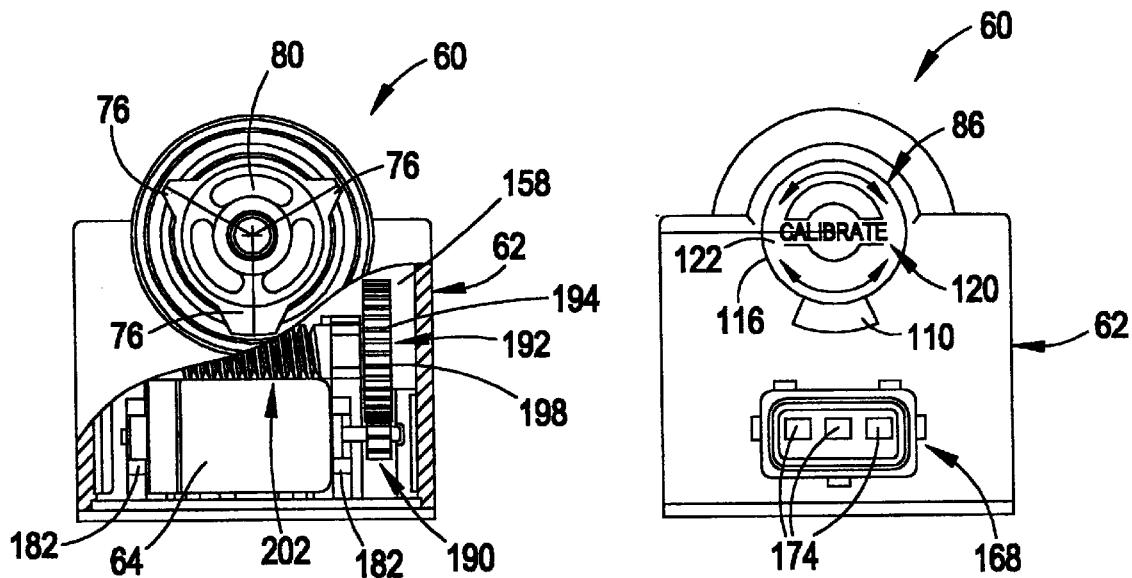
FIG. 3
FIG. 4

MOTORIZED HEADLAMP ADJUSTER

RELATED APPLICATION

This application claims the benefit of U.S. Provisional Application Ser. No. 60/198,945, filed Apr. 21, 2000.

BACKGROUND

The present invention relates generally to headlamp adjusters which are used to adjust the position of a reflector of an automobile headlamp assembly, and relates more specifically to a headlamp adjuster which is motorized.

Modern day headlamps for vehicles are engineered and designed to be aerodynamically efficient. In this regard, the headlamps are designed as sealed assemblies wherein the portion of the headlamp approximate the outer surface of the automobile is relatively stationary, and is aerodynamic.

A typical modem day headlamp assembly 12 is illustrated in a plan view seen as FIG. 1, and normally includes: a fixed housing 20, to which an outer headlamp lens 22 is affixed; a movable reflector 24, which is mounted within the fixed housing 20; and a stationary headlamp bulb (not shown), which is positioned within the movable reflector 24. Typically, the movable reflector 24 is mounted to the housing 20 by a universal or ball-type pivot 26 which is stationary, or fixed, on the housing 20.

A first pivot point 28 is disposed generally vertical of the fixed pivot 26, and a second pivot point 30 is disposed generally horizontal of the fixed pivot 26. As such, the movable reflector 24 may be pivoted about the fixed pivot 26 in the vertical and horizontal planes to aim the headlamp beam. Adjustment mechanisms, or headlamp adjusters, 40 and 42 are typically provided at the first and second pivot points, 28 and 30, normally termed the vertical pivot and the horizontal pivot, and the headlamp adjusters 40 and 42 can be operated to effect movement of the reflector 24 in the vertical and horizontal planes.

The headlamp adjusters 40 and 42 are typically mounted to the housing 20 of the headlamp assembly 12 and have adjuster output shafts 44, 46 operatively connected to the movable reflector 24 by ball and socket type pivots, or the like, such that linear movement of the adjuster output shafts 44, 46 produces pivoting of the movable reflector in the vertical and horizontal planes. Specifically, each headlamp adjuster 40, 42 typically includes drive structure 48, 50 for receiving a tool, and typically the drive structure 48, 50 is precision geared to the adjuster output shaft 44, 46. The gearing provides that using the tool to rotate the drive structure 48, 50 causes linear translation of the adjuster output shaft 44, 46 and therefore adjustment of the position of the headlamp reflector 24.

Before an automobile is released to the consumer, the movable reflectors of the headlamp assemblies are adjusted to a desired position so that the headlamp beams are properly aimed in both the vertical and horizontal directions. To this end, headlamp adjusters are normally operated at the automobile assembly plant. Thereafter, if a movable reflector moves from its desired position, due, for example, to vibration, jarring, or the vehicle being in an accident, a mechanic can operate the headlamp adjusters in order to properly re-align the reflectors.

It is advantageous to provide that a headlamp adjuster is motorized. Some motorized headlamp adjusters are disclosed in U.S. Pat. Nos. 5,070,433 and 5,105,342, European Publication Nos. 0 297 953, 0652 134, 0 692 404 and 0 692 405, and Japanese Publication Nos. 05085255, 58101836 and 59008544. Motorized headlamp adjusters provide that, instead of having to use a tool to adjust the headlamp, a motor is actuated to extend or retract an adjuster output shaft to adjust the headlamp.

While motorized headlamp adjusters are presently commercially available, many of those which are currently available present certain disadvantages. For example, many of the motorized headlamp adjusters which are presently available are complex and include many parts, are not sealed well, and do not seal well with the headlamp housing when the headlamp adjuster is installed. As such, these headlamp adjusters are expensive, relatively difficult to assemble, and may have a reduced life due to moisture leaking into the assembly. Additionally, the life of the headlamp may be reduced due to moisture leaking into the headlamp housing due to inadequate sealing between the headlamp adjuster and the housing of the headlamp assembly.

OBJECTS AND SUMMARY

Accordingly, it is an object of an embodiment of the present invention to provide a motorized headlamp adjuster which is less complex than at least some of the previous designs of motorized headlamp adjusters.

Another object of an embodiment of the present invention to provide a motorized headlamp adjuster which is relatively easy to assemble.

Still another object of an embodiment of the present invention to provide a motorized headlamp adjuster which is sealed and which, when installed, provides desired sealing with a headlamp housing.

Briefly, and in accordance with one or more of the foregoing objects, the present invention provides a motorized headlamp adjuster which is operably connectable to a control circuit and which is engageable with a headlamp assembly. Specifically, the headlamp adjuster includes an adjuster output shaft which is engageable with a reflector of a headlamp assembly. The headlamp adjuster includes a housing, and the adjuster output shaft extends from the housing. The adjuster output shaft preferably has a sealing member thereon which seals with the housing. Preferably, an external surface of the housing also has a sealing member thereon for engaging and sealing with the housing of the headlamp assembly when the headlamp adjuster is installed—i.e., when the adjuster output shaft is engaged with the headlamp reflector and the housing of the headlamp adjuster is engaged with the housing of the headlamp assembly. As such, the headlamp adjuster is sealed, and seals with a headlamp housing when installed. Preferably, the headlamp adjuster does not include several complex components and is relatively easy to assemble.

BRIEF DESCRIPTION OF THE DRAWINGS

The organization and manner of the structure and function of the invention, together with further objects and advantages thereof, may be understood by reference to the following description taken in connection with the accompanying drawings, wherein:

FIG. 2 is a top plan view of a headlamp adjuster which is in accordance with an embodiment of the present invention;

FIG. 3 is a front, elevational view of the headlamp adjuster shown in FIG. 2, showing a portion of a housing broken away;

FIG. 4 is a rear, elevational view of the headlamp adjuster shown in FIG. 2, showing a calibration knob engaged with a housing;

DESCRIPTION

Figure 1:
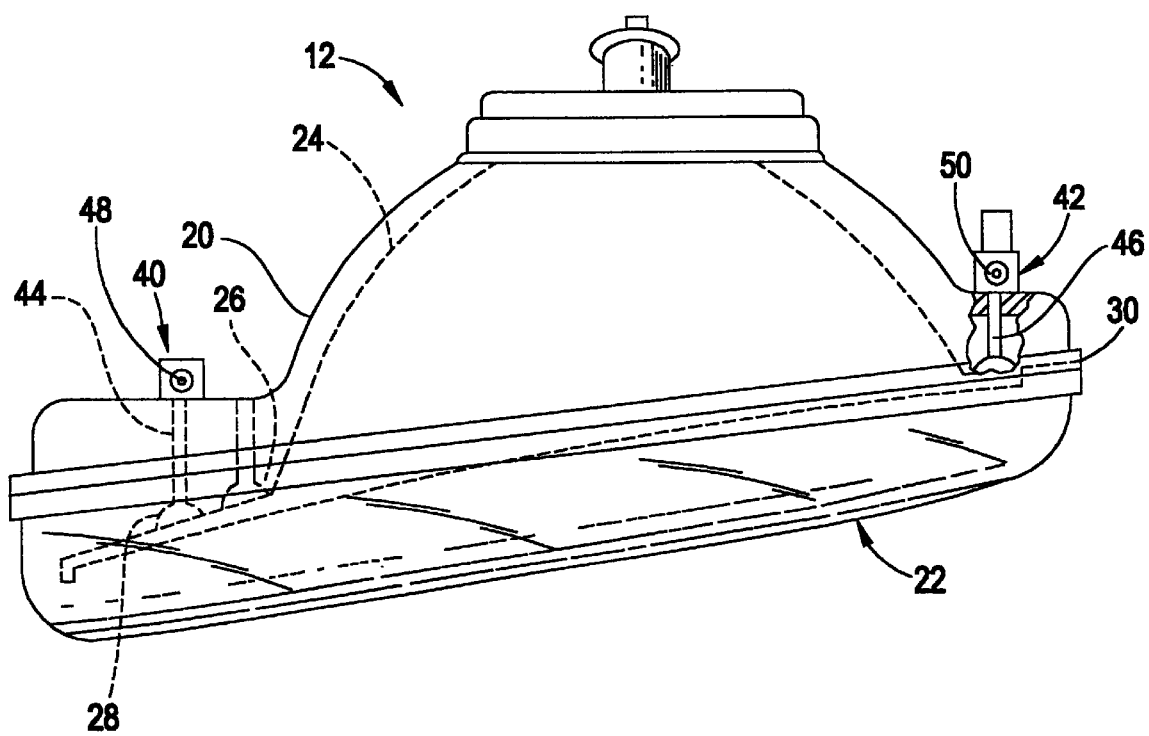
FIG. 1 is a plan view of a typical headlamp assembly.

While the present invention may be susceptible to embodiment in different forms, there is shown in the drawings, and herein will be described in detail, an embodiment of the invention with the understanding that the present description is to be considered an exemplification of the principles of the invention and is not intended to limit the invention to that as illustrated and described herein.

A motorized headlamp adjuster 60 which is in accordance with an embodiment of the present invention is shown in FIGS. 2–4, 6 and 7. The headlamp adjuster 60 includes a housing 62 that is sealed, and the headlamp adjuster 60 is configured to seal with a housing 20 of a headlamp assembly 12 when installed (see FIG. 1). The headlamp adjuster 60 does not include several complex components and, as will be described, is relatively easy to assemble.

As shown in FIGS. 3, 6–8, 10 and 15–17, the headlamp adjuster 60 includes a motor 64. Preferably, the motor 64 is a 12 volt dc motor which is ultimately operably connected to a control circuit 66 (see FIGS. 7 and 8). The configuration of the control circuit 66 will be described more fully later herein.

As discussed, the headlamp adjuster 60 is configured for engagement with the reflector 24 of a headlamp assembly 12 (see FIG. 1). Specifically, the headlamp adjuster 60 includes an adjuster output shaft 68 which is engageable with the reflector 24. The adjuster output shaft 68 extends from the housing 62 (see FIGS. 2, 6–8, 12 and 14) of the headlamp adjuster 60. As shown in FIGS. 6–8 and 12, the adjuster output shaft 60 extends from an aperture 70 in the housing 62, and has a sealing member 72 thereon which seals with an internal wall 74 of the housing 62. The sealing member 72 may comprise an o-ring formed of nitrile. Preferably, the aperture 70 provides a close tolerance fit with the adjuster output shaft 68, and the internal wall 74 of the housing 62 has a fine finish which facilitates relatively smooth reciprocation when the adjuster output shaft 68 translates in the housing 62 (i.e., when the headlamp reflector 24 is adjusted).

As shown in FIGS. 2–3, 6–8 and 12–14, the housing 62 may have a plurality of protrusions or ears 76 on the end 78 of the housing 62 for engaging the housing 20 of a headlamp assembly 12 (see FIG. 1). As such, the headlamp adjuster 60 is installed by engaging a ball portion 80 of the adjuster output shaft 68 with a corresponding socket on a headlamp reflector 24 and by inserting the end 78 of the housing 62 in an aperture in the housing 20 of the headlamp assembly 12. Thereafter, the headlamp adjuster 60 is rotated sufficiently to engage the protrusions 76 with corresponding structure in the housing 20, thereby effectively locking the headlamp adjuster 60 in place with respect to the headlamp housing 20. Of course, the headlamp adjuster 60 may be configured to be installed in a different manner.

Preferably, a sealing member 82 is on an external surface 84 of the housing 62, generally proximate the end 78, such that the sealing member 82 engages and seals with the housing 20 of the headlamp assembly 12 when the headlamp adjuster 60 is installed. The sealing member 82 may comprise an annular member formed of R7744 silicone. The seal provided by the sealing member 72 on the adjuster output shaft 68 and the seal provided by the sealing member 82 on the external surface 84 of the housing 62 generally provides that the headlamp housing 20 is generally sealed off when the headlamp adjuster 60 is installed.

Figure 5:
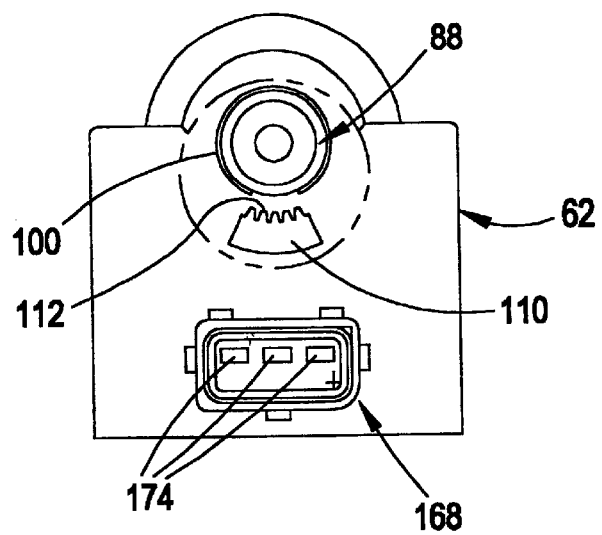
FIG. 5 is a view similar to FIG. 4, but showing the calibration knob disengaged from the housing and removed from an end of an output shaft of the headlamp adjuster.
Figure 6:
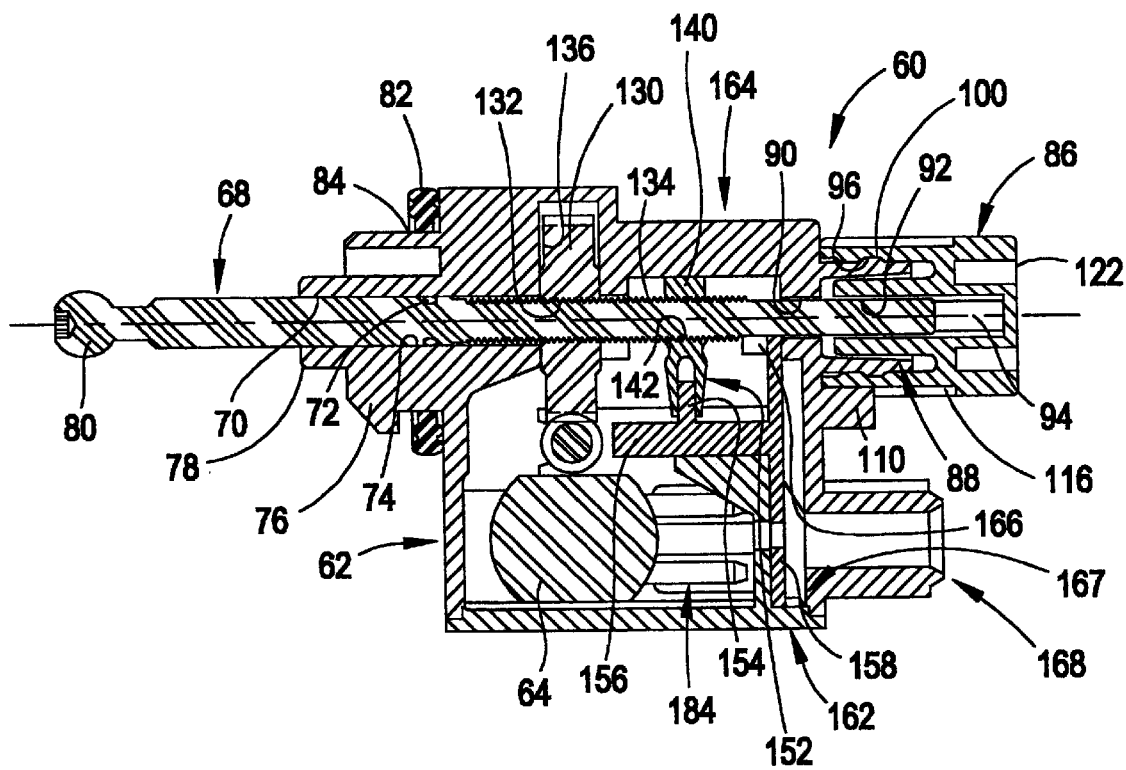
FIG. 6 is a cross sectional view of the headlamp adjuster shown in FIG. 2, taken along line 6—6 of FIG. 2.
Figure 7:
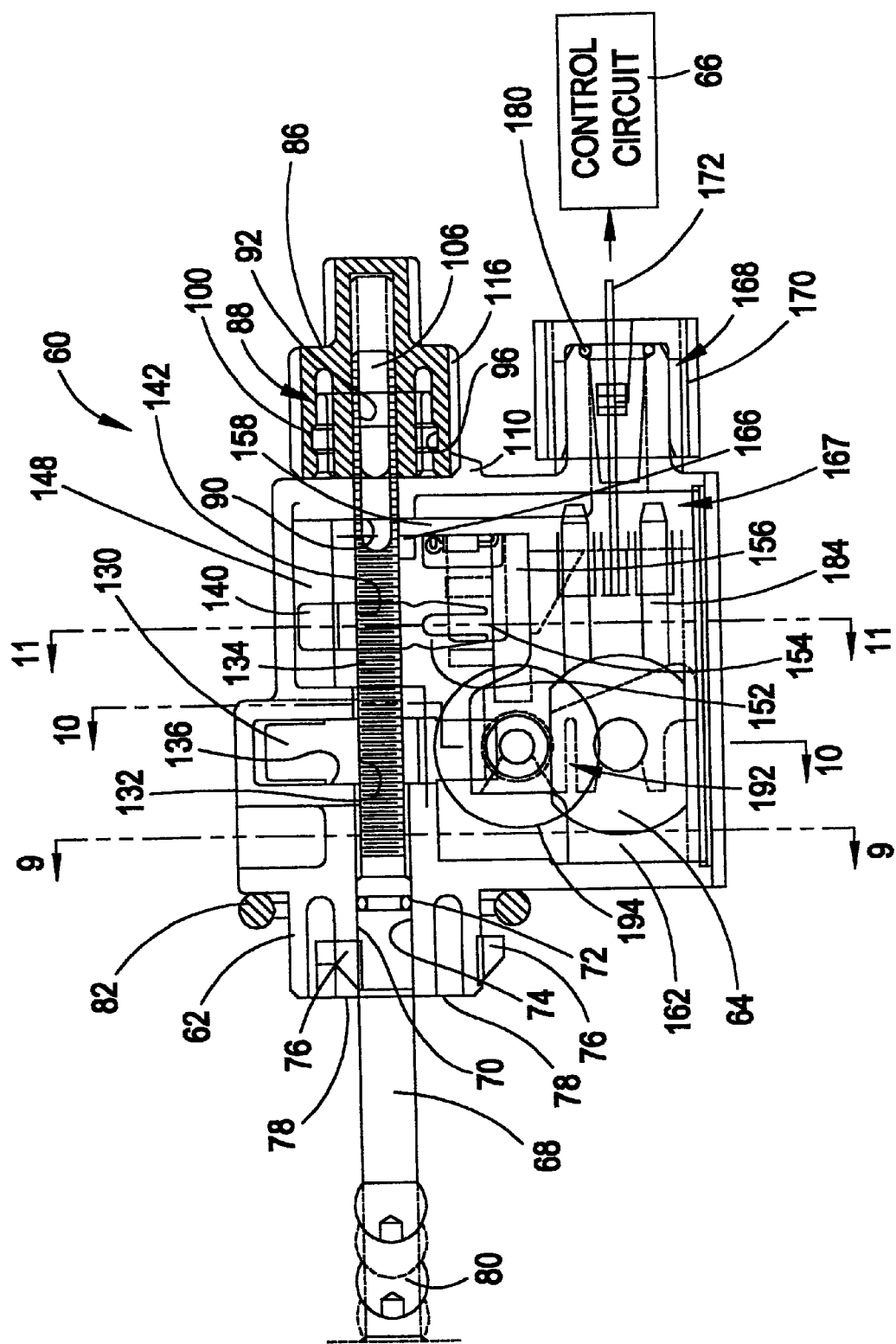
FIG. 7 is a view similar to FIG. 6, but showing many of the internal components of the headlamp adjuster in phantom instead of in cross.
Figure 8:
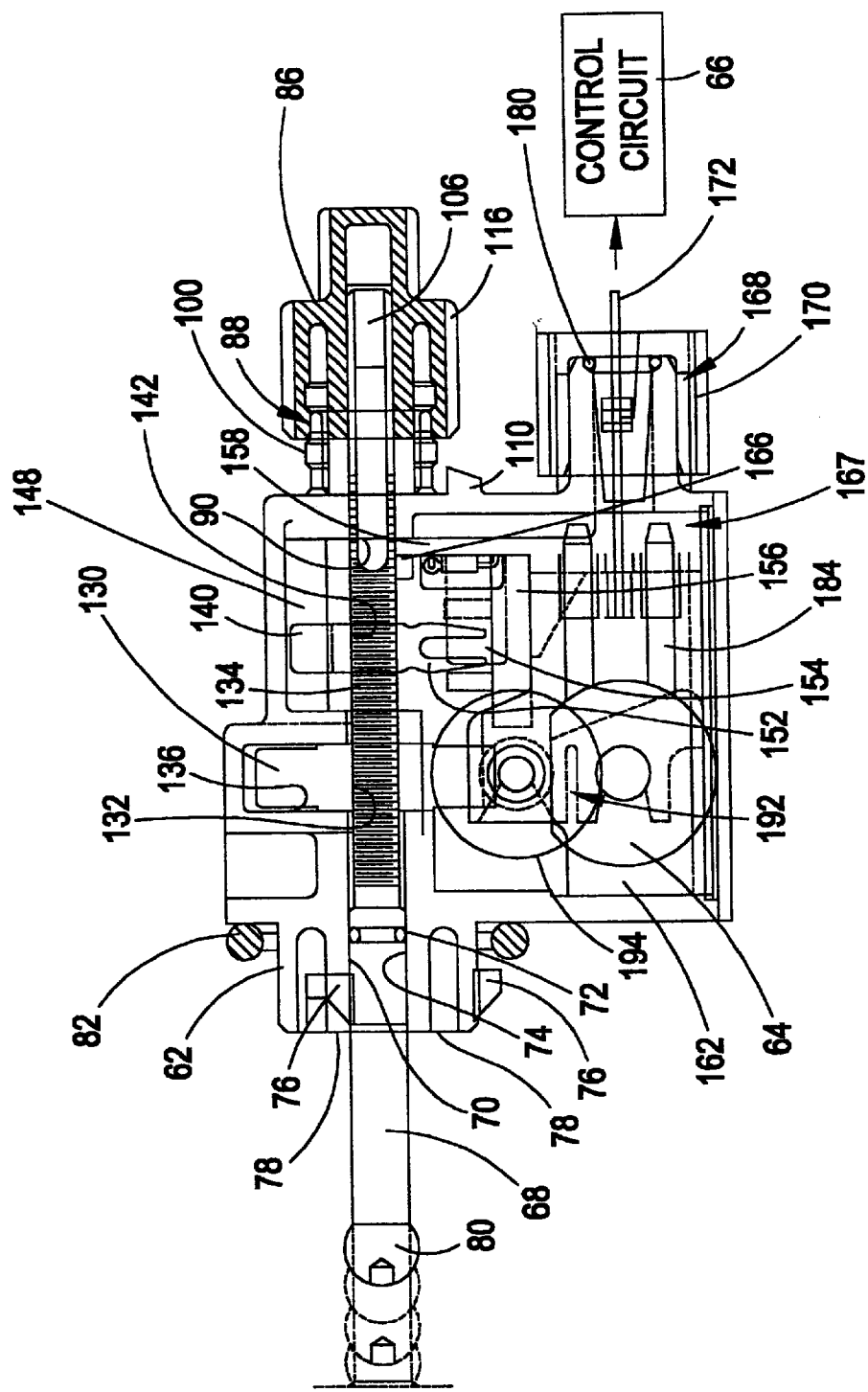
FIG. 8 is a view similar to FIG. 7, but showing a calibration knob in a calibration position, wherein the calibration knob is disengaged from the housing, but is still engaged with the output shaft.
Figure 9:
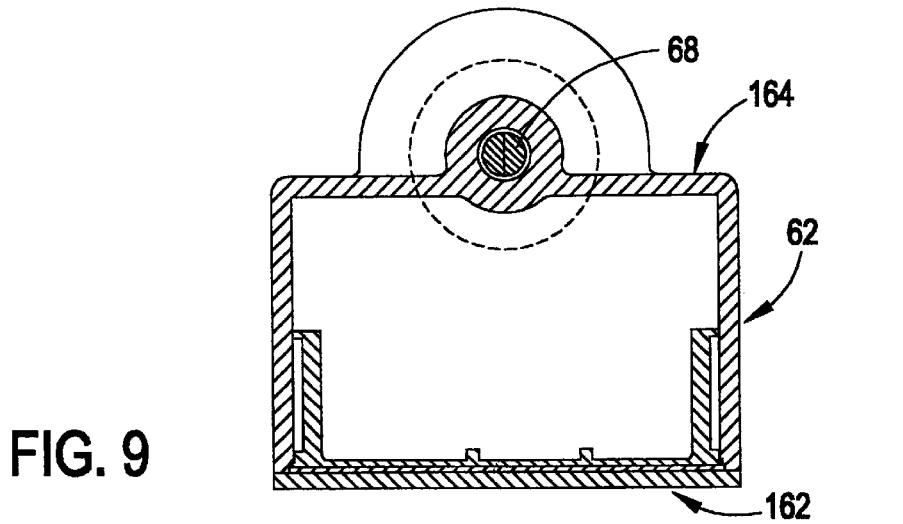
FIG. 9 is a cross sectional view of that which is shown in FIG. 7, taken along line 9—9 of FIG. 7.
Figure 10:
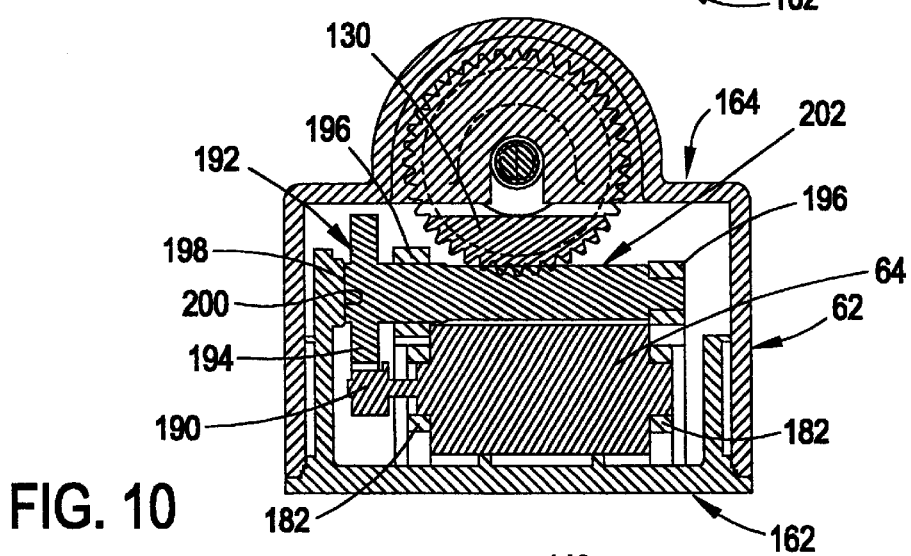
FIG. 10 is a cross sectional view of that which is shown in FIG. 7, taken along line 10—10 of FIG. 7.

As shown in FIGS. 6–8, the adjuster output shaft 68 engages a calibration knob 86 which is engageable with the housing 62. The calibration knob 86 can be selectively engaged and disengaged from the housing 62. In FIG. 4, the calibration knob 86 is shown engaged with the housing 62, and in FIG. 5, the calibration knob 86 is shown disengaged (i.e., removed) from the housing 62. As shown in FIGS. 6–8, preferably the calibration knob 86 is engageable with an extension 88 on the housing 62 such that the adjuster output shaft 68 extends through an aperture 90 in the housing 62 and engages an internal surface 92 of the calibration knob 86. Preferably, the length of the mating (i.e., the length of a bore 94 in the calibration knob 86 which provides the internal surface 92—see FIG. 6) between the calibration knob 86 and the adjuster output shaft 68 is axially longer than the required total adjuster output shaft movement, wherein total movement is equal to the calibration range plus the adjustment range.

The calibration knob 86 may include one or more internal recesses 96 which are configured to engage a corresponding annular lip 100 on the extension 88 of the housing 62, thereby providing that the calibration knob 86 engages the extension 88 on the housing 62 in a snap fit arrangement. Preferably, the annular lip 100 and the corresponding recess 96 are configured such that when the recess 96 on the calibration knob 86 engages the annular lip 100 on the extension 88, the calibration knob 86 is generally axially retained on the extension 88, and to disengage the calibration knob 86 from the annular lip 100, a generally axial pulling force (along axis 102—see FIG. 2) must be actively applied to the calibration knob 86.

The internal surface 92 of the calibration knob 86 preferably provides a bi-flat profile, and the bi-flat profile on the calibration knob 86 engages a corresponding bi-flat portion 106 on the adjuster output shaft 68. As such, the calibration knob 86 has a sliding fit with the adjuster output shaft 68. The engagement of the bi-flat portion 106 of the adjuster output shaft 68 with the bi-flat of the calibration knob 86 provides that, if the calibration knob 86 is prevented from rotating relative to the housing 62, the adjuster output shaft 68 is also prevented from rotating relative to the housing 62. Of course, alternative structure may be provided on the calibration knob 86 and the adjuster output shaft 68 to provide this anti-rotation feature. For example, a crucible profile (instead of the bi-flat profile) may be provided on the adjuster output shaft 68 and on the internal surface 92 of the calibration knob 86.

As shown in FIGS. 4–8 and 12, structure is preferably provided on the housing for engagement with the calibration knob 86 such that the calibration knob 86 is prevented from rotating relative to the housing 62. The structure on the housing 62 may comprise a molded extension 110 which provides a gear tooth segment 112 (see FIG. 5). The gear tooth segment 112 is preferably configured to engage corresponding gear teeth 114 on an external surface 116 of the calibration knob 86 (see FIG. 2). When the gear teeth 114 on the external surface 116 of the calibration knob 86 are engaged with the gear tooth segment 112 on the molded extension 110 of the housing 62, the calibration knob 86 is prevented from rotating relative to the housing 62.

As will be described more fully later herein, to calibrate the headlamp adjuster 60, the calibration knob 86 is generally axially withdrawn (along axis 102—see FIG. 2) from the extension 88 on the housing 62 such that the calibration knob 86 disengages from the annular lip 100 provided on the extension 88 of the housing 62, but remains engaged with the adjuster output shaft 68. This position of the calibration knob 86 is shown in FIG. 8. Thereafter, the calibration knob 86 is rotated to calibrate the headlamp adjuster 60. Specifically, rotating the calibration knob 86 when the calibration knob 86 is in the position shown in FIG. 8 causes the adjuster output shaft 68 to rotate and translate in the housing 62, thereby causing the headlamp reflector 24 engaged with the ball portion 80 of the adjuster output shaft 68 to change position.

Once the headlamp is properly aimed, the calibration knob 86 is pushed generally axially toward the housing (along axis 102—see FIG. 2) such that the calibration knob 86 engages the annular lip 100 on the extension 88, and such that the gear teeth 114 on the calibration knob 86 engage the gear tooth segment 112 on the housing 62. Hence, the calibration knob 86 is axially and rotationally retained on the housing 62. Thereafter, neither the calibration knob 86 nor the adjuster output shaft 68 can readily rotate relative to the housing 62. Preferably, the gear teeth 114 on the calibration knob 86 are configured to provide enhanced finger grip on the external surface 116 of the calibration knob 86, such as when the calibration knob 86 is moved axially to engage or disengage the calibration knob 86 with the annular lip 100 and gear tooth segment 112 and when the calibration knob 86 is being rotated to calibrate the headlamp adjuster 60. As shown in FIG. 4, indicia 120 relating to the calibration feature may be provided on the end 122 of the calibration knob 86.

Preferably, the gear tooth segment 112 on the housing 62 and the gear teeth 114 on the calibration knob 86 are configured to provide that the headlamp adjuster 60 is tamper resistant/tamper evident. Specifically, if the calibration knob 86 is forcibly rotated while still engaged with the gear tooth segment 112 on the housing 62, damage to the calibration knob 86 and/or extension 88 occurs, such as marring on the external surface 116 of the calibration knob 86 or breakage of the extension 88 on the housing 62, thereby indicating that someone has tampered with the headlamp adjuster 60.

As shown in FIGS. 6–8, 12 and 14, an output gear, such as a helical gear 130, is engaged with the adjuster output shaft 68. Specifically, the helical gear 130 includes a threaded central bore 132 which is threadably engaged with a threaded portion 134 of the adjuster output shaft 68. The helical gear 130 is disposed in a recess 136 in the housing 62 such the helical gear 130 can rotate in the recess 136, but is generally prevented from translating axially (i.e., along the threaded portion 134 of the adjuster output shaft 68). Rotation of the helical gear 130 when the adjuster output shaft 68 is engaged with the calibration knob 86, and while the calibration knob 86 is prevented from rotating relative to the housing 62, causes the adjuster output shaft 68 to translate in the housing 62, thereby adjusting the position of the headlamp reflector 24.

Figure 11:
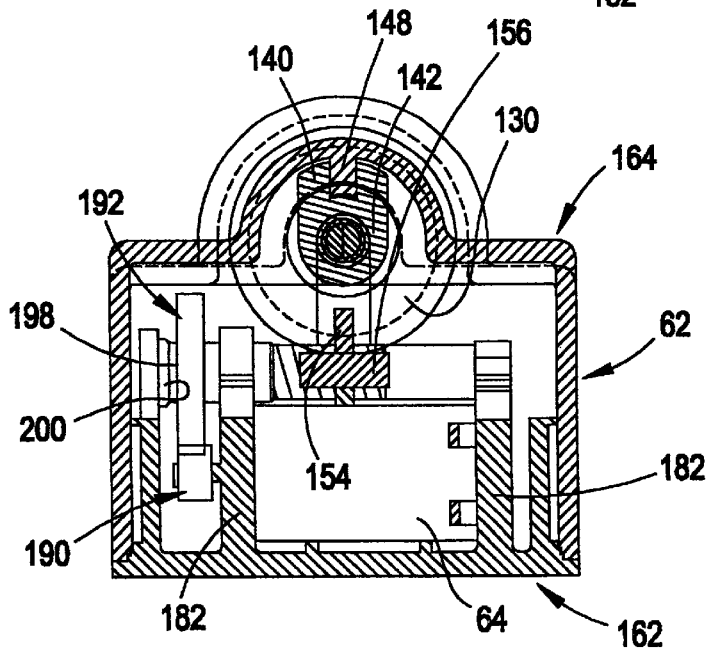
FIG. 11 is a cross sectional view of that which is shown in FIG. 7, taken along line 11—11 of FIG. 7.
Figure 19:
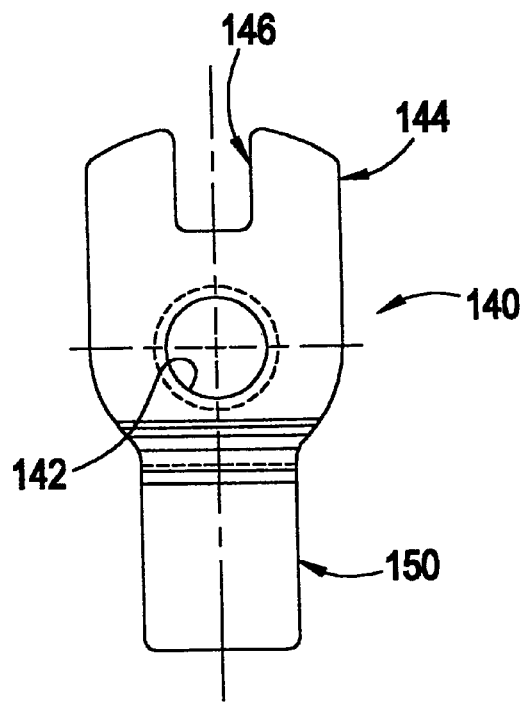
FIG. 19 is a front, elevational view of a position actuator of the headlamp adjuster.

A position actuator 140 is also engaged with the threaded portion 134 of the adjuster output shaft 68. Preferably, the position actuator 140 is engaged with the adjuster output shaft 68 at an axial position that satisfies the range of operation (i.e., the range of travel of the adjuster output shaft 68). Like the helical gear 130, the position actuator 140 includes a threaded bore 142 which is threadably engaged with the threaded portion 134 of the adjuster output shaft 68. A top portion 144 of the position actuator 140 includes a cut-out 146 (see FIGS. 11 and 19) which is keyed to a rail 148 in the housing 62 (see FIGS. 7, 8 and 11). The engagement between the cut-out 146 of the position actuator 140 and the rail 148 in the housing 62 provides that the position actuator 140 can reciprocate in the housing 62 (i.e., translate along the threaded portion 134 of the adjuster output shaft 68) but cannot rotate with respect to the housing.

A bottom portion 150 of the position actuator 140 includes a fork portion 152 (see FIGS. 6–8, 11 and 12), and the fork portion 152 engages a slide or actuator 154 of a potentiometer 156. Preferably, the potentiometer 156 is mounted to a circuit board 158 (see FIGS. 3, 6–8 and 15–17) that has a circuit 160 mounted thereon, and the potentiometer 156 is effectively part of the circuit 160. When the position actuator 140 reciprocates in the housing 62 (i.e., along the threaded portion 134 of the adjuster output shaft 68), the position actuator 140 moves the potentiometer slide 154, thereby communicating to the circuit 160 on the circuit board 158 that the adjuster output shaft 68 has translated axially in the housing 62, changing the position of the headlamp reflector 24.

As shown in FIGS. 3, 6–8 and 15–17, the circuit board 158 is preferably mounted to a base 162 which engages a cover portion 164 of the housing 62 to effectively form the housing 62. Preferably, the circuit board 158 engages one or more retention tabs 166 which are provided in the housing cover 164. Preferably, the base 162 includes retention tabs 167 for engaging the housing cover 164 when the housing cover 164 is installed on the base 162.

As shown in FIGS. 4–8 and 12, the housing cover 164 preferably includes a receptacle 168 for receiving a male connector 170, wherein the male connector 170 is conductively connected to the control circuit 66. The male connector 170 may include connector latches (not shown) which engage with the receptacle 168 or other part of the housing 62 to provide a secure connection therebetween. Preferably, the male connector 170 includes terminals 172 which, when the male connector 170 is engaged in the receptacle 168, extend through apertures 174 (see FIGS. 4 and 5) in the receptacle 168 and conductively connect with the circuit 160 on the circuit board 158. Hence, installing the male connector 170 in the receptacle 168 causes the control circuit 66 to become conductively connected to the circuit 160 on the circuit board 158. As shown, preferably a connector sealing member 180 is provided on the receptacle 168 for sealing with the male connector 170 when the male connector 170 is engaged in the receptacle 168.

As discussed, and as shown in FIGS. 3, 6–8, 10 and 15–17, the headlamp adjuster 60 includes a motor 64. Preferably, the motor 64 is mounted to a pair of fork-like extensions or arms 182 which are provided on the housing base 162 (see FIGS. 3, 10, 11 and 17). The motor 64 includes a motor lead frame 184 that connects to the circuit board 158, such that the motor 64 is effectively part of the circuit 160 which is on the circuit board 158. As discussed, the control circuit 66 is conductively connected to the circuit board 158. Hence, the control circuit 66 is operably connected to the motor 64 via the circuit 160 which is on the circuit board 158. As discussed, preferably the motor 64 is a dc motor. The control circuit 66 drives the motor bi-directionally via the motor lead frame 184 (i.e., via polarity change).

As shown in FIGS. 3, 10, 11, 15 and 17, the motor 64 drives a motor pinion 190, and the motor pinion 190 is engaged with an intermediate gear assembly 192. Specifically, the intermediate gear assembly 192 includes a spur gear portion 194 which engages the motor pinion 190, wherein rotation of the motor pinion 190 causes the intermediate gear assembly 192 to rotate. Preferably, the intermediate gear assembly 192 is carried by a pair of fork-like extensions 196 which are provided on the housing base 162 (see FIGS. 3, 10, 11 and 17), generally above the fork-like extensions 182 which retain the motor 64. Preferably, an end 198 of the intermediate gear assembly 192 contactably engages a wall 200 provided on the base 162, thereby limiting axial travel of the intermediate gear assembly 192.

The intermediate gear assembly 192 also includes a helical gear portion 202 which is configured to mate with the helical gear 130 which is retained in the recess 136 in the housing cover 164, and which is threadably engaged with the adjuster output shaft 68. Hence, operation of the motor 64 causes the motor pinion 190 to rotate, which drives the spur gear portion 194 of the intermediate gear assembly 192, which causes the intermediate gear assembly 192 to rotate. As the intermediate gear assembly 192 rotates, the helical gear portion 202 thereof drives the helical gear 130. As the helical gear 130 rotates, the adjuster output shaft 68 translates in the housing 62, and the position of the headlamp reflector 24 changes. As the adjuster output shaft 68 translates, the position actuator 140 reciprocates in the housing 62, causing the potentiometer slide 154 to move, thereby providing an indication to the control circuit 66 of the position of the adjuster output shaft 68.

In other words, the potentiometer 156 provides a resistance change to the control circuit 66 for a feedback of position of the adjuster output shaft 68. The potentiometer 156 effectively provides that the headlamp adjuster 60 operates by effectively matching the resistance of a pair of resistors—one provided in the control circuit 66, and one provided by the potentiometer 156. Specifically, preferably the control circuit 66 is configured such that a user (i.e., a mechanic or the driver) can move a slide of a potentiometer in the control circuit 66, effectively changing one resistance (i.e., provided by the potentiometer in the control circuit 66) in the control circuit 66, and in response, the motor 64 of the headlamp adjuster 60 operates and translates the adjuster output shaft 68. As a result of the adjuster output shaft 68 translating, the resistance of a resistor (i.e., the resistance provided by the potentiometer 156) in the headlamp adjuster 160 changes, and the adjuster output shaft 68 continues to translate until the resistance of the resistor in the headlamp adjuster (i.e., the resistance provided by the potentiometer 156) is generally equal to the resistance of the resistor in the control circuit 66 (i.e., the resistance provided by the potentiometer, as set by the user).

To calibrate the headlamp adjuster 60, the calibration knob 86 is generally axially withdrawn (along axis 102—see FIG. 2) from the extension 88 on the housing 62 such that the calibration knob 86 disengages from the annular lip 100 provided on the extension 88 of the housing 62, but remains engaged with the adjuster output shaft 68. This position of the calibration knob 86 is shown in FIG. 8. Thereafter, the calibration knob 86 is rotated to calibrate the headlamp adjuster 60. Specifically, rotating the calibration knob 86 when the calibration knob 86 is in the position shown in FIG. 8 causes the adjuster output shaft 68 to rotate and translate in the housing 62, thereby causing the headlamp reflector 24 engaged with the ball portion 80 of the adjuster output shaft 68 to change position. As the adjuster output shaft 68 rotates, the helical gear 130 is prevented from rotating along with the adjuster output shaft 68 as a result of the helical gear's 130 engagement with the intermediate gear assembly 192 and the engagement of the intermediate gear assembly 192 with the motor pinion 190. During calibration, the adjuster output shaft 68 translates without the position actuator 140 translating therewith. Hence, when the headlamp adjuster 60 is calibrated, the potentiometer slide 158 does not change position. Hence, during calibration the adjuster output shaft 68 translates (by rotating the calibration knob 86, as discussed above) to obtain the proper aim (i.e., the "zero position") for the headlamp reflector 24, without disturbing the resistance value provided to the control circuit 66 by the potentiometer 156. After the proper aim is attained, the calibration knob 86 is placed in the locked position, wherein the gear teeth 114 on the external surface 116 of the calibration knob 86 are engaged with the gear tooth segment 112 on the housing 62, and the calibration knob 86 is snapped onto the annular lip 100 on the housing 62.

The headlamp adjuster 60 is well sealed, seals well with the housing 20 of a headlamp assembly 12, and is not extremely complex. Preferably, the headlamp adjuster 60 is relative easy to assemble also, and a preferred method of assembly will now be described.

Figure 12:
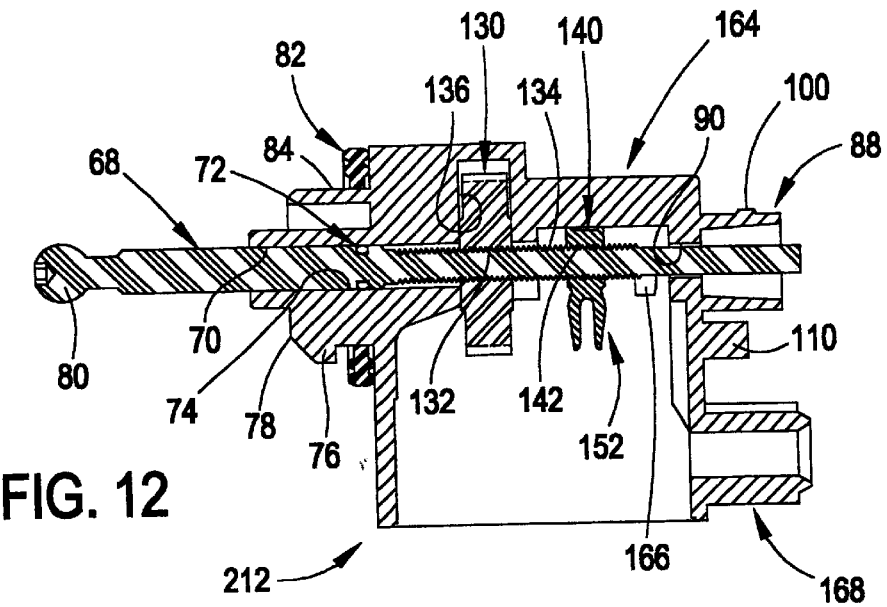
FIG. 12 is a view similar to FIG. 6, but only showing a housing subassembly portion (i.e., housing with output drive) of the headlamp adjuster.
Figure 13:
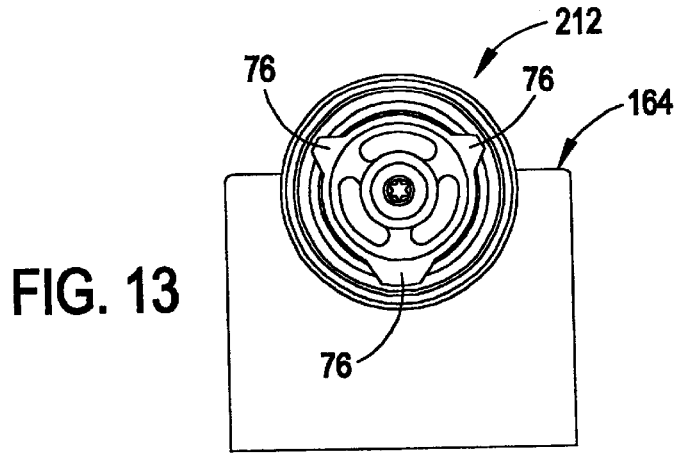
FIG. 13 is a front, elevational view of the housing subassembly shown in FIG. 12.
Figure 14:
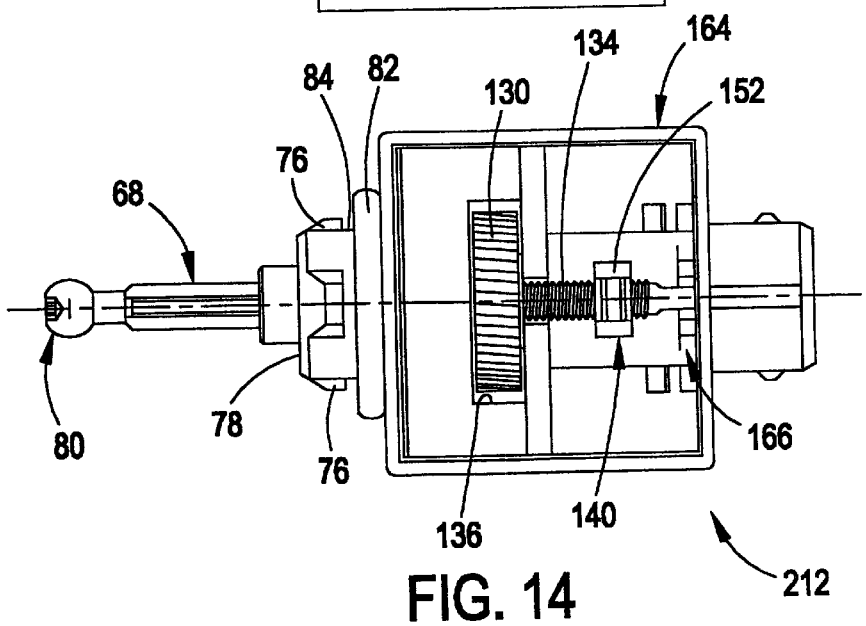
FIG. 14 is a bottom, plan view of the housing subassembly shown in FIG. 12.
Figure 15:
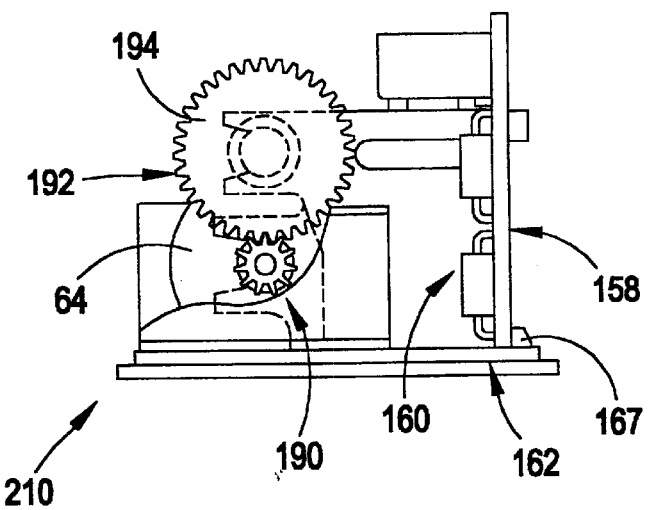
FIG. 15 is a side, elevational view of a base subassembly (i.e., control chassis) of the headlamp adjuster.
Figure 16:
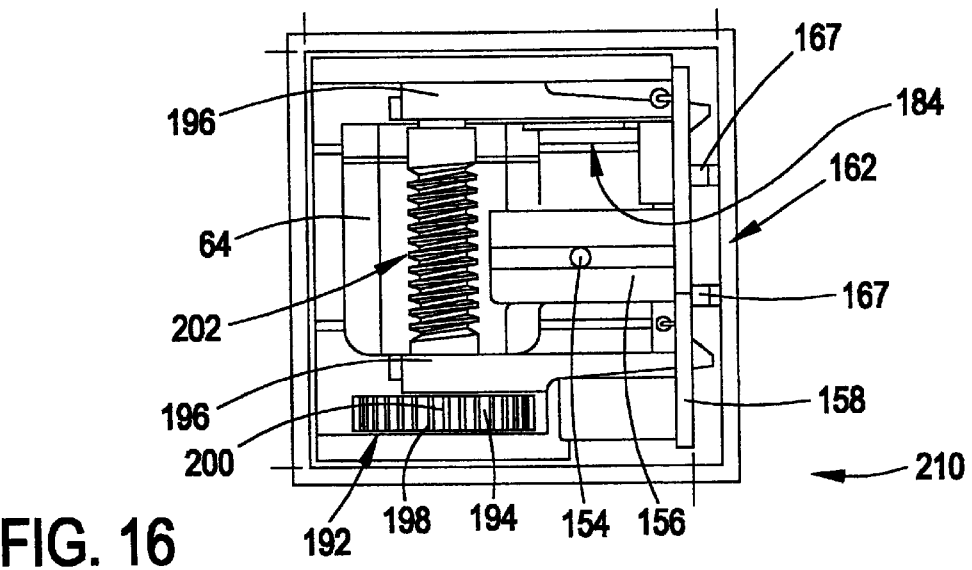
FIG. 16 is a top, plan view of the base subassembly shown in FIG. 15.
Figure 17:
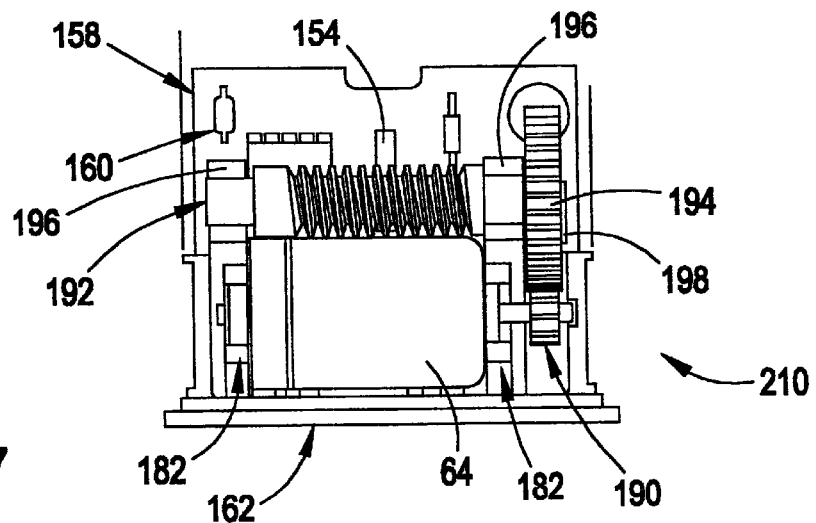
FIG. 17 is a front, elevational view of the base subassembly shown in FIG. 15.
Figure 18:
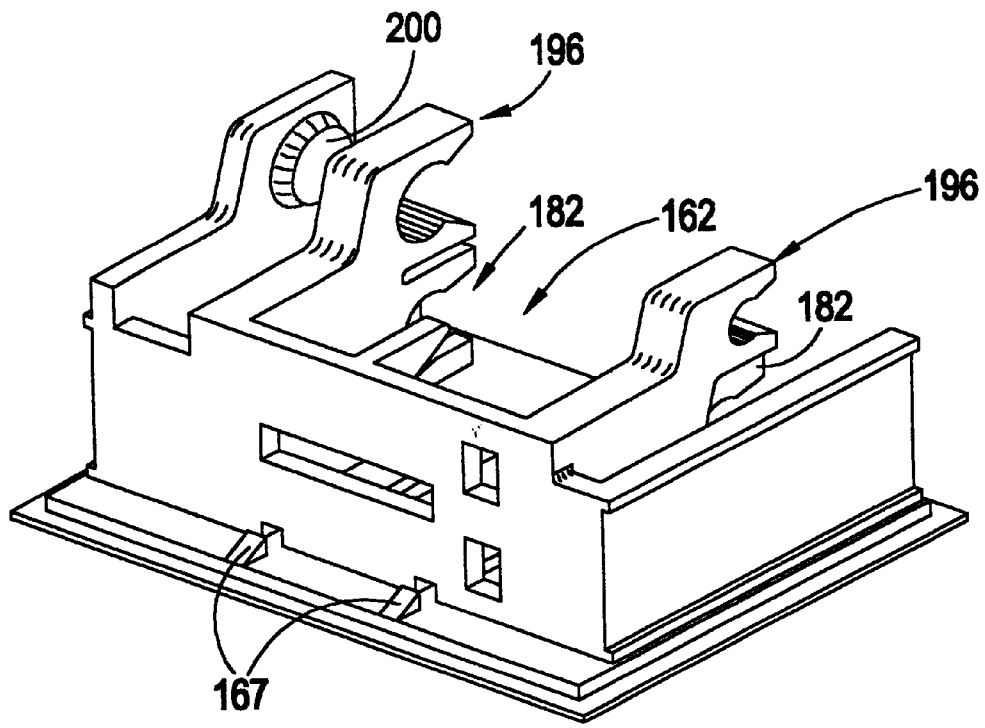
FIG. 18 is a perspective view of a base of the headlamp adjuster.

Preferably, the headlamp adjustor 60 effectively consists of three major components: a control chassis 210; a housing with output drive 212; and a sealed connector 170. The control chassis 210 is shown in FIGS. 15–17, and consists of the housing base 162, the motor 64 with the motor pinion 190, the intermediate gear assembly 192, the potentiometer 156, and the circuit board 158. The housing with output drive 212 is shown in FIGS. 12–14, and consists of the housing cover 164, the adjuster output shaft 68, sealing members 72 and 82, helical gear 130 and the position actuator 140. The sealed connector 170 consists of the male connector 170 which is connected to the control circuit 66.

To assemble the control chassis 210, the circuit board 158 is attached to the base 162, wherein the circuit board 158 is retained by tabs 166. Then, the motor 64 is snapped into the base 162 (i.e., into the two fork-like extensions 182), and the motor lead frame 184 is plugged into the circuit board 158.

Then, the intermediate gear assembly 192 is snapped into the base 162 (i.e., into the two fork-like extensions 196) while engaging the spur gear portion 194 with the motor pinion 190. Preferably, after assembly, the control chassis 210 is tested.

To assemble the housing with output drive 212, the sealing member 72 is placed on the adjuster output shaft 68, and the helical gear 130 is placed in the recess 136 with the housing cover 164 inverted (i.e., as shown in FIG. 14). Then, the position actuator 140 is engaged with the rail 148 in the housing 62 (i.e., the cut-out 146 on the top portion 144 of the position actuator 140 is keyed to the rail 148 in the housing 62), and at the "zero" axial position. Then, the adjuster output shaft 68 is driven through the threaded bores 132, 142 in the helical gear 130 and the position actuator 140. Then, the adjuster output shaft 68 is driven to the pre-set or "zero" position.

Preferably, before mating the control chassis 210 with the housing with output drive 212, the two sub-assemblies are checked separately and re-worked, if necessary. In mating the control chassis 210 with the housing with output drive 212, the position actuator 140 must align with the potentiometer slide 154, and the housing tabs 166 must mate with the circuit board 158. Then, the control chassis 210 can be sonic welded to the housing with output drive 212 (i.e., the housing cover 164 can be sonic welded to the base 162). Then, the calibration knob 86 is mated with the adjuster output shaft 68, but is not mated with the annular lip 100 on the housing 62. Then, the male connector 170 is installed in the receptacle 168, and connector latches (if provided) on the male connector 170 are locked onto the housing 62. The conductive connection between the terminals 172 of the male connector 170 and the circuit board 158 provides connection to battery power which drives the motor 64, and a control signal is provided to the circuit 160 from the dashboard potentiometer (i.e., the potentiometer which is adjusted by the user).

Although an embodiment is discussed herein, it should be understood that modifications may be made thereto while staying within the scope of the present invention.

What is claimed is:

1. A motorized headlamp adjuster which is operably connectable to a control circuit and which is engageable with a reflector of a headlamp assembly, said motorized headlamp adjuster comprising: a housing having an external surface; an adjuster output shaft which extends from said housing and is engageable with the reflector; a motor in the housing for translating said adjuster output shaft; and a calibration member engaged with said adjuster output shaft and rotatable to calibrate said adjuster output shaft, said housing including structure on its external surface with which said calibration member is engageable to prevent said calibration member from substantially rotating relative to said housing and said calibration member being disengageable from said structure on said external surface of said housing and, while being disengaged from said structure, is rotatable to move and calibrate said adjuster output shaft.

2. A motorized headlamp adjuster as recited in claim 1, wherein said calibration member is engageable with said housing in a snap fit arrangement.

3. A motorized headlamp adjuster as recited in claim 1, wherein at least a portion of said adjuster output shaft has at least one of a bi-flat profile and crucible profile, wherein at least a portion of an internal surface of said calibration member has at least one of a bi-flat profile and crucible profile, wherein said profile on said calibration member is engageable with said profile on said adjuster output shaft thereby providing that said adjuster output shaft is generally prevented from substantially rotating relative to said housing when said calibration member is generally prevented from substantially rotating relative to said housing.

4. A motorized headlamp adjuster as recited in claim 1, wherein said calibration member arid said adjuster output shaft are generally prevented from substantially rotating relative to said housing when said calibration member is engaged with said adjuster output shaft and is engaged with said structure on said external surface of said housing.

5. A motorized headlamp adjuster as recited in claim 1, wherein said structure on said external surface of said housing with which said calibration member is engageable to prevent said calibration member from rotating substantially relative to said housing comprises a gear tooth segment which engages corresponding gear teeth structure on an external surface of said calibration member.

6. A motorized headlamp adjuster as recited in claim 1, further comprising an output gear in said housing engaged with said adjuster output shaft.

7. A motorized headlamp adjuster as recited in claim 1, further comprising an output gear in said housing engaged with said adjuster output shaft, said output gear rotatable when said calibration member is engaged with said structure on said external surface of said housing, wherein rotation of said output shaft causes said adjuster output shaft to translate relative to said housing.

8. A motorized headlamp adjuster as recited in claim 1, further comprising a position actuator engaged with said adjuster output shaft, and further comprising a potentiometer including a slide, said position actuator engaged with said slide of said potentiometer.

9. A motorized headlamp adjuster as recited in claim 8, wherein said potentiometer is mounted to a circuit board in said housing, said circuit board having a circuit thereon, said circuit conductively connectable to said control circuit.

10. A motorized headlamp adjuster as recited in claim 9, wherein said housing includes a receptacle configured to receive a connector which is conductively connected to said control circuit, wherein said connector conductively connects to said circuit on said circuit board when said connector is received in said receptacle.

11. A motorized headlamp adjuster as recited in claim 6, further comprising a motor pinion and a motor which is configured to drive said motor pinion, and further comprising an intermediate gear assembly which is engaged with said output gear, said motor pinion engaged with said intermediate gear assembly, wherein said motor drives said output gear using said motor pinion and said intermediate gear assembly.

12. A motorized headlamp adjuster as recited in claim 1, further comprising a scaling member disposed on said adjuster output shaft and sealed and slidable along an internal surface of said housing.

13. A motorized headlamp adjuster which is operably connectable to a control circuit and which is engageable with a reflector of a headlamp assembly, said motorized headlamp adjuster comprising: a housing; an adjuster output shaft which extends from said housing and is engageable with the reflector; an output gear in said housing engaged with said adjuster output shaft: a position actuator engaged with said adjuster output shaft; a potentiometer including a slide, said position actuator engaged with said slide of said potentiometer; motor pinion; a motor which is configured to drive said motor pinion; an intermediate gear assembly which is engaged with said output gear, said motor pinion engaged with said intermediate gear assembly, wherein said motor drives said output gear using said motor pinion and said intermediate gear assembly; a motor in the housing for translating said adjuster output shaft; and a calibration member engaged with said adjuster output shaft arid rotatable to calibrate said adjuster output shaft, said housing including structure on its external surface with which said calibration member is engageable to prevent said calibration member from substantially rotating relative to said housing and said calibration member being disengageable from said structure on said external surface of said housing and, while being disengaged from said structure, is rotatable to move and calibrate said adjuster output shaft.

14. A motorized headlamp adjuster as recited in claim 13, wherein said potentiometer is mounted to a circuit board in said housing, said circuit board having a circuit thereon, said circuit conductively connectable to said control circuit.

15. A motorized headlamp adjuster as recited in claim 14, wherein said housing includes a receptacle configured to receive a connector which is conductively connected to said control circuit, wherein said connector conductively connects to said circuit on said circuit board when said connector is received in said receptacle.

16. A motorized headlamp adjuster as recited in claim 13, wherein said calibration member is engageable with said housing in a snap fit arrangement.

17. A motorized headlamp adjuster as recited in claim 13, wherein at least a portion of said adjuster output shaft has at least one of a bi-flat profile and crucible profile, wherein at least a portion of an internal surface of said calibration member has at least one of a bi-flat profile and crucible profile, wherein said profile on said calibration member is engageable with said profile on said adjuster output shaft thereby providing that said adjuster output shaft is generally prevented from substantially rotating relative to said housing when said calibration member is generally prevented from substantially rotating relative to said housing.

18. A motorized headlamp adjuster as recited in claim 13, wherein said calibration member and said adjuster output shaft arc generally prevented from substantially rotating relative to said housing when said calibration member is engaged with said adjuster output shaft and is engaged with said structure on said external surface of said housing.

19. A motorized headlamp adjuster as recited in claim 13, wherein said structure on said external surface of said housing with which said calibration member is engageable to prevent said calibration member from rotating substantially relative to said housing comprises a gear tooth segment which engages corresponding gear teeth structure on an external surface of said calibration member.

20. A motorized headlamp adjuster as recited in claim 13, further comprising a scaling member disposed on said adjuster output shaft and scaled and slidable along an internal surface of said housing.

\* \* \* \* \*

UNITED STATES PATENT AND TRADEMARK OFFICE
CERTIFICATE OF CORRECTION

PATENT NO. : 6,568,837 B2
DATED : May 27, 2003
INVENTOR(S) : Ronald S. Denley

It is certified that error appears in the above-identified patent and that said Letters Patent is hereby corrected as shown below:

Column 10,
Line 6, "arid" should be -- and --
Line 28, "in claim 1," should be -- in claim 7 --
Line 52, "scaling" should be -- sealing --

Column 11,
Line 4, "arid" should be -- and --

Column 12,
Line 11, "arc" should be -- are --
Line 24, "scaling" should be -- sealing --
Line 25, "scaled" should be -- sealed --

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,568,837 B2
DATED : May 27, 2003
INVENTOR(S) : Ronald S. Denley

It is certified that error appears in the above-identified patent and that said Letters Patent is hereby corrected as shown below:

Title page,
Item [56], References Cited, U.S. PATENT DOCUMENTS, add the following references:

|  |  |  |  |
|---|---|---|---|
| -- 5,622,421 | 4/1997 | Turley, Jr. et al. ……… | 362/463 |
| 5,197,794 | 3/1993 | Scott et al. …………. | 362/463 |
| 5,673,993 | 10/1997 | Fukui …………….. | 362/463 -- |

Signed and Sealed this

Fourth Day of May, 2004

JON W. DUDAS
*Acting Director of the United States Patent and Trademark Office*